(12) United States Patent
Yamamoto (10) Patent No.: US 11,877,364 B2
(45) Date of Patent: Jan. 16, 2024

(54) ILLUMINATION CONTROL DEVICE AND ILLUMINATION SYSTEM

(71) Applicant: YAZAKI CORPORATION, Tokyo (JP)

(72) Inventor: Shohei Yamamoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/949,676

(22) Filed: Sep. 21, 2022

(65) Prior Publication Data
US 2023/0088786 A1 Mar. 23, 2023

(30) Foreign Application Priority Data
Sep. 22, 2021 (JP) .................................. 2021-154656

(51) Int. Cl.
*H05B 45/20* (2020.01)
(52) U.S. Cl.
CPC .................... *H05B 45/20* (2020.01)
(58) Field of Classification Search
CPC .... H05B 45/20; H05B 45/325; H05B 47/105; H05B 47/175; Y02B 20/40
See application file for complete search history.

(56) References Cited

U.S. PATENT DOCUMENTS

| 2015/0379941 | A1* | 12/2015 | Satake | G09G 3/2003 |
| | | | | 345/82 |
| 2017/0041992 | A1* | 2/2017 | Sumi | H05B 47/18 |
| 2017/0290127 | A1* | 10/2017 | Shigezane | G09G 3/3433 |
| 2022/0095427 | A1* | 3/2022 | Jiang | H05B 45/20 |
| 2022/0201820 | A1* | 6/2022 | Kumar | H05B 45/36 |

FOREIGN PATENT DOCUMENTS

JP 2016-126868 A 7/2016

* cited by examiner

*Primary Examiner* — Raymond R Chai
(74) *Attorney, Agent, or Firm* — Sughrue Mion, PLLC (57) ABSTRACT

In an illumination control device, a first effect control unit acquires brightness information corresponding to waveform height for each piece of unit time information when effect information for changing brightness is acquired, acquire reference duty ratios corresponding to the acquired brightness information from color tables corresponding to color information added to the effect information, and output pulse signals of the output duty ratios corresponding to the acquired reference duty ratios. Also, a second effect control unit acquires the color information corresponding to the waveform height for each piece of unit time information when the effect information for changing color is acquired, acquire reference duty ratios corresponding to the brightness information added to the effect information from the color tables corresponding to the acquired color information, and output pulse signals of the output duty ratios corresponding to the acquired reference duty ratios.

7 Claims, 8 Drawing Sheets

ILLUMINATION CONTROL DEVICE AND ILLUMINATION SYSTEM

CROSS-REFERENCE TO RELATED APPLICATIONS

This application is based on and claims priority under 35 USC 119 from Japanese Patent Application No. 2021-154656 filed on Sep. 22, 2021, the contents of which are incorporated herein by reference.

TECHNICAL FIELD

The present disclosure relates to an illumination control device and an illumination system.

BACKGROUND ART

There is also proposed an illumination system that adjusts luminance and color by controlling a duty ratio of a full-color LED having red (R), green (G), and blue (B) light-emitting diodes (LEDs). The illumination system includes a master electronic control unit (ECU) as a host control device and an illumination ECU as an illumination control device. The master ECU transmits a control signal to the illumination ECU, and the illumination ECU controls a duty ratio of a pulse signal output to the full-color LED in accordance with the control signal.

However, when it is desired to perform an effect of changing brightness, the master ECU needs to transmit the control signal each time the brightness changes, resulting in an increase in an occupation time of a bus. In addition, there is a restriction on an expressible effect method due to a communication cycle.

JP2016-126868A discloses a luminance control device that stores a reference duty ratio for each unit period and changes a duty ratio of a pulse that drives a light emitting element in each of a plurality of unit periods with reference to the stored reference duty ratio. In such a luminance control device, it is unnecessary to output a control signal each time brightness changes. However, there has been a problem that only the effect of changing the brightness can be produced and effects having various variations cannot be produced.

SUMMARY OF INVENTION

The present disclosure has been made in view of the above circumstance, and an object of the present disclosure is to provide an illumination control device and an illumination system capable of executing effects having various variations.

In order to implement the object described above, an aspect of non-limiting embodiments of the present disclosure relates to provide an illumination control device for controlling output duty ratios of pulse signals output to a red light emitting element, a green light emitting element, and a blue light emitting element, the illumination control device including:
  an acquisition unit configured to acquire effect information;
  a first storage unit configured to store a plurality of color tables showing reference duty ratios corresponding to brightness information and provided for each piece of color information;
  a second storage unit configured to store an effect table showing a waveform height of an effect waveform corresponding to unit time information;
  a first effect control unit configured to sequentially acquire the brightness information corresponding to the waveform height for each piece of unit time information when the effect information for changing brightness is acquired, sequentially acquire the reference duty ratios corresponding to the sequentially acquired brightness information from the color tables corresponding to the color information added to the effect information, and output the pulse signals of the output duty ratios corresponding to the sequentially acquired reference duty ratios; and
  a second effect control unit configured to sequentially acquire the color information corresponding to the waveform height for each piece of unit time information when the effect information for changing color is acquired, sequentially acquire the reference duty ratios corresponding to the brightness information added to the effect information from the color tables corresponding to the sequentially acquired color information, and output the pulse signals of the output duty ratios corresponding to the sequentially acquired reference duty ratios.

Also, according to an aspect of the present disclosure, there is provided an illumination system including:
  a host control device configured to transmit effect information; and
  an illumination control device configured to control output duty ratios of pulse signals output to a red light emitting element, a green light emitting element, and a blue light emitting element in accordance with communication with the host control device, in which
  the illumination control device includes:
    an acquisition unit configured to acquire effect information;
    a first storage unit configured to store a plurality of color tables showing reference duty ratios corresponding to brightness information and provided for each piece of color information;
    a second storage unit configured to store an effect table showing a waveform height of an effect waveform corresponding to unit time information;
    a first effect control unit configured to sequentially acquire the brightness information corresponding to the waveform height for each piece of unit time information when the effect information for changing brightness is acquired, sequentially acquire the reference duty ratios corresponding to the sequentially acquired brightness information from the color tables corresponding to the color information added to the effect information, and output the pulse signals of the output duty ratios corresponding to the sequentially acquired reference duty ratios; and
    a second effect control unit configured to sequentially acquire the color information corresponding to the waveform height for each piece of unit time information when the effect information for changing color is acquired, sequentially acquire the reference duty ratios corresponding to the brightness information added to the effect information from the color tables corresponding to the sequentially acquired color information, and output the pulse signals of the output duty ratios corresponding to the sequentially acquired reference duty ratios.

According to the illumination control device and the illumination system of the present disclosure, it is possible to execute effects having various variations.

The present disclosure has been briefly described above. Further, details of the present disclosure will be further clarified by reading through a mode for carrying out the invention described below (hereinafter referred to as an "embodiment") with reference to the accompanying drawings.

DESCRIPTION OF EMBODIMENTS

A specific embodiment of the present disclosure will be described below with reference to the drawings.

Figure 1:
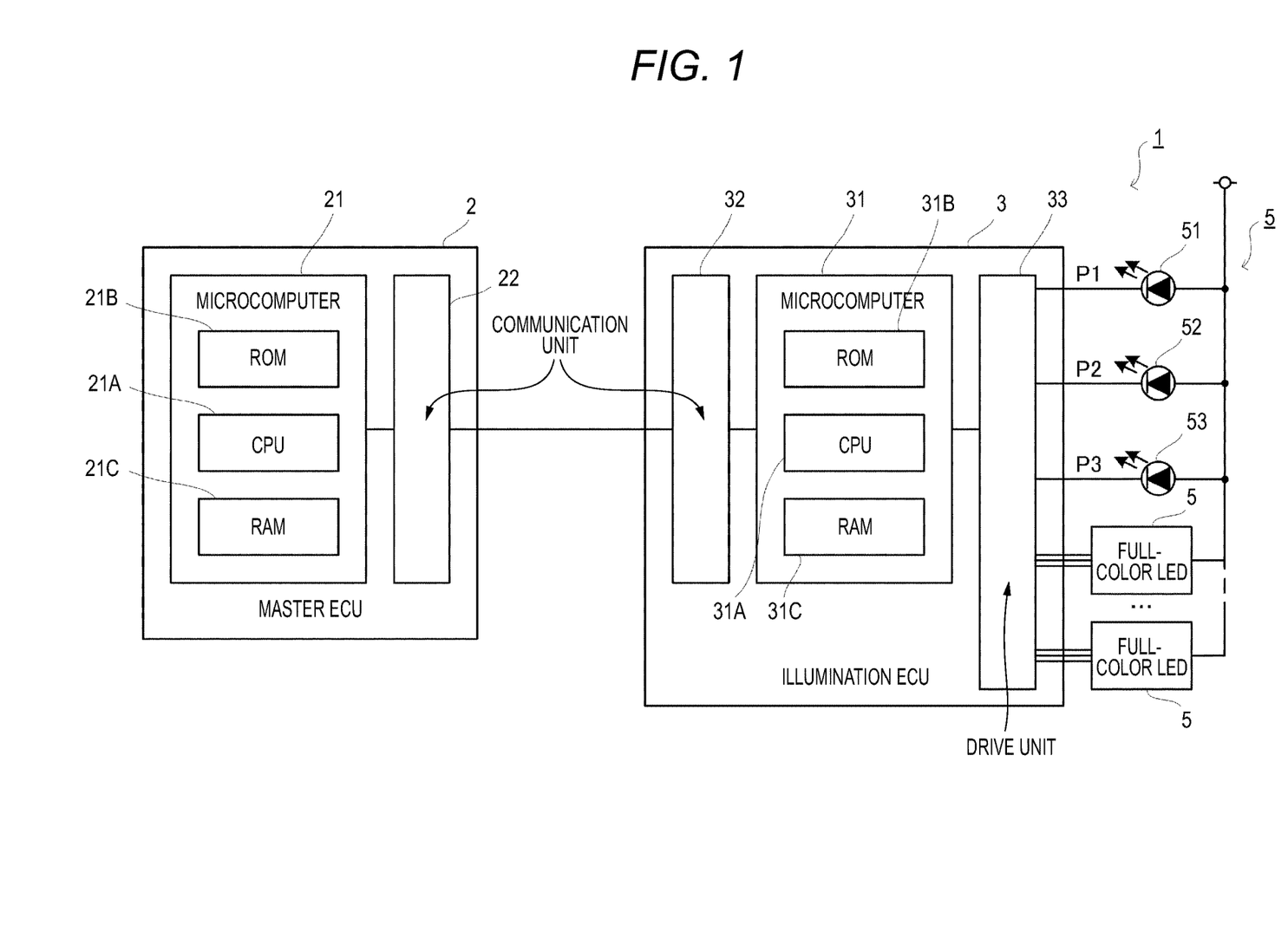
FIG. 1 is a configuration diagram showing an illumination system according to an embodiment of the present disclosure.

An illumination system 1 of the present embodiment is mounted on a vehicle, for example, and controls a plurality of full-color LEDs 5. The full-color LEDs 5 each include a red light emitting element (RLED) 51, a green light emitting element (GLED) 52, and a blue light emitting element (BLED) 53, and may adjust luminance and color. The illumination system 1 includes a master ECU 2 as a host control device and an illumination ECU 3 as an illumination control device.

The master ECU 2 performs multiplex communication with the illumination ECU 3. The master ECU 2 includes a microcomputer 21 and a communication unit 22. The microcomputer 21 includes a central processing unit (CPU) 21A that executes various kinds of processing in accordance with a program, a read only memory (ROM) 21B that is a read-only memory storing a processing program and the like executed by the CPU 21A, and a random access memory (RAM) 21C that is a readable and writable memory having a work area and the like used in various processes in the CPU 21A, and governs overall control of the master ECU 2. The communication unit 22 includes a circuit for communicating with the illumination ECU 3.

The master ECU 2 transmits a turn-on instruction of the full-color LED 5 to the illumination ECU 2 based on state monitoring of various switches or various sensors that detect various states on a vehicle operable by a user (a driver or the like) and information input from a host ECU (not shown).

The turn-on instruction includes target full-color LED information and effect numbers as effect information, which will be described later.

The illumination ECU 3 controls the full-color LEDs 5 in accordance with the turn-on instruction from the master ECU 2. The illumination ECU 3 includes a microcomputer 31, a communication unit 32, and a drive unit 33. The microcomputer 31 includes a CPU 31A that executes various kinds of processing in accordance with a program, a ROM 31B that is a read-only memory storing a processing program and the like executed by the CPU 31A, and a RAM 31C that is a readable and writable memory having a work area and the like used in various processes in the CPU 31A, and governs overall control of the illumination ECU 3.

The communication unit 32 includes a circuit for communicating with the master ECU 3. The drive unit 33 is connected to a power supply (not shown), outputs pulse signals P1, P2, and P3 to the RLED 51, the GLED 52, and the BLED 53, respectively, and causes the RLED 51, the GLED 52, and the BLED 53 to emit light with colors and luminance set by output duty ratios DR, DG, and DB of the pulse signals P1, P2, and P3. The drive unit 33 outputs the pulse signals P1, P2, and P3 with the output duty ratios DR, DG, and DB corresponding to drive signals received from the microcomputer 31 to the RLED 51, the GLED 52, and the BLED 53, respectively, and drives the RLED 51, the GLED 52, and the BLED 53.

Figure 2:
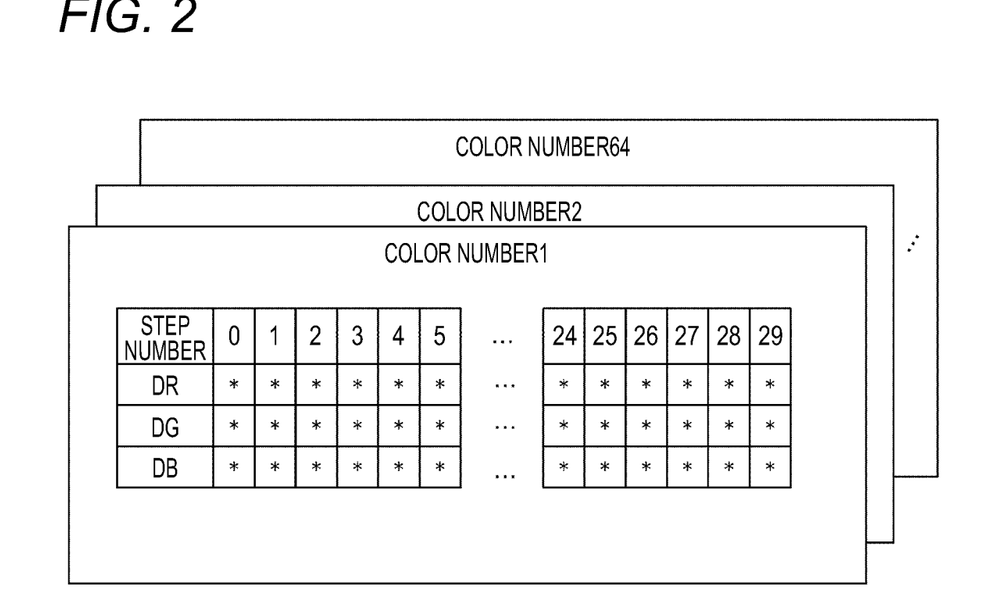
FIG. 2 shows color tables stored in a ROM constituting an illumination ECU shown in FIG. 1.
Figure 3:
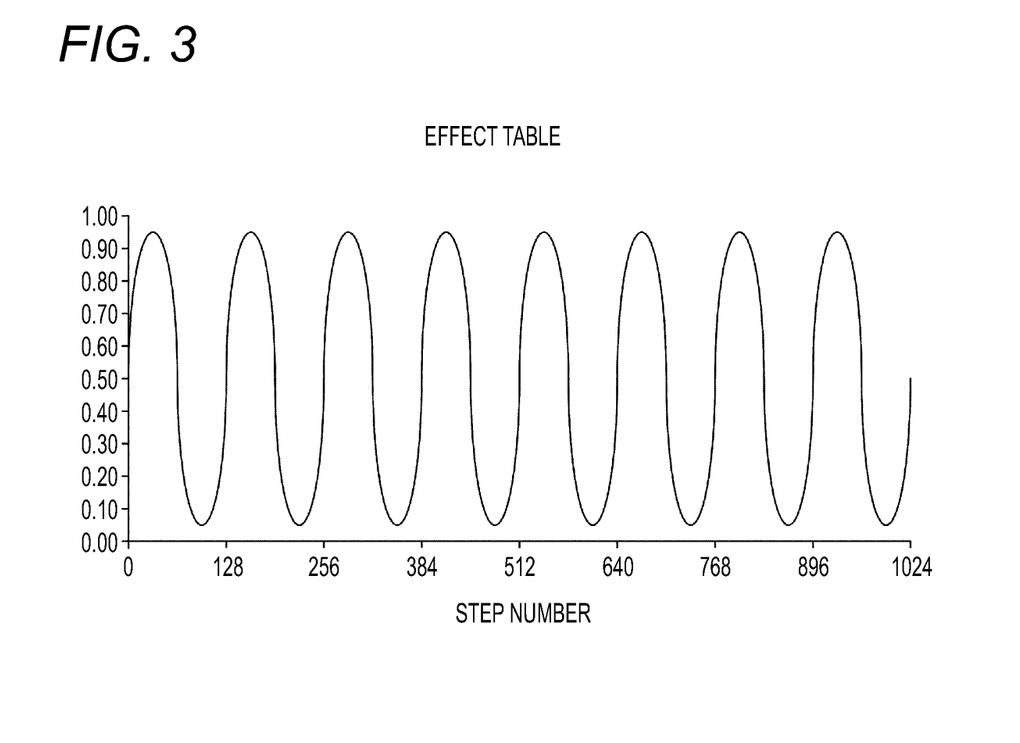
FIG. 3 shows an effect table stored in the ROM constituting the illumination ECU shown in FIG. 1.

In the present embodiment, the ROM 31B (a first storage unit and a second storage unit) of the microcomputer 31 stores color tables shown in FIG. 2 and an effect table shown in FIG. 3. Each of the color tables is provided for each color number as color information. In the present embodiment, 64 color tables corresponding to color numbers "1" to "64" are stored in the ROM 31B. The color numbers are set in arrangement of color coordinates in accordance with a target effect. In the present embodiment, as shown in FIG. 4, the color numbers are set in such arrangement that the color gradually changes from green to blue, changes from blue to red, and changes from blue to green.

Figure 4:
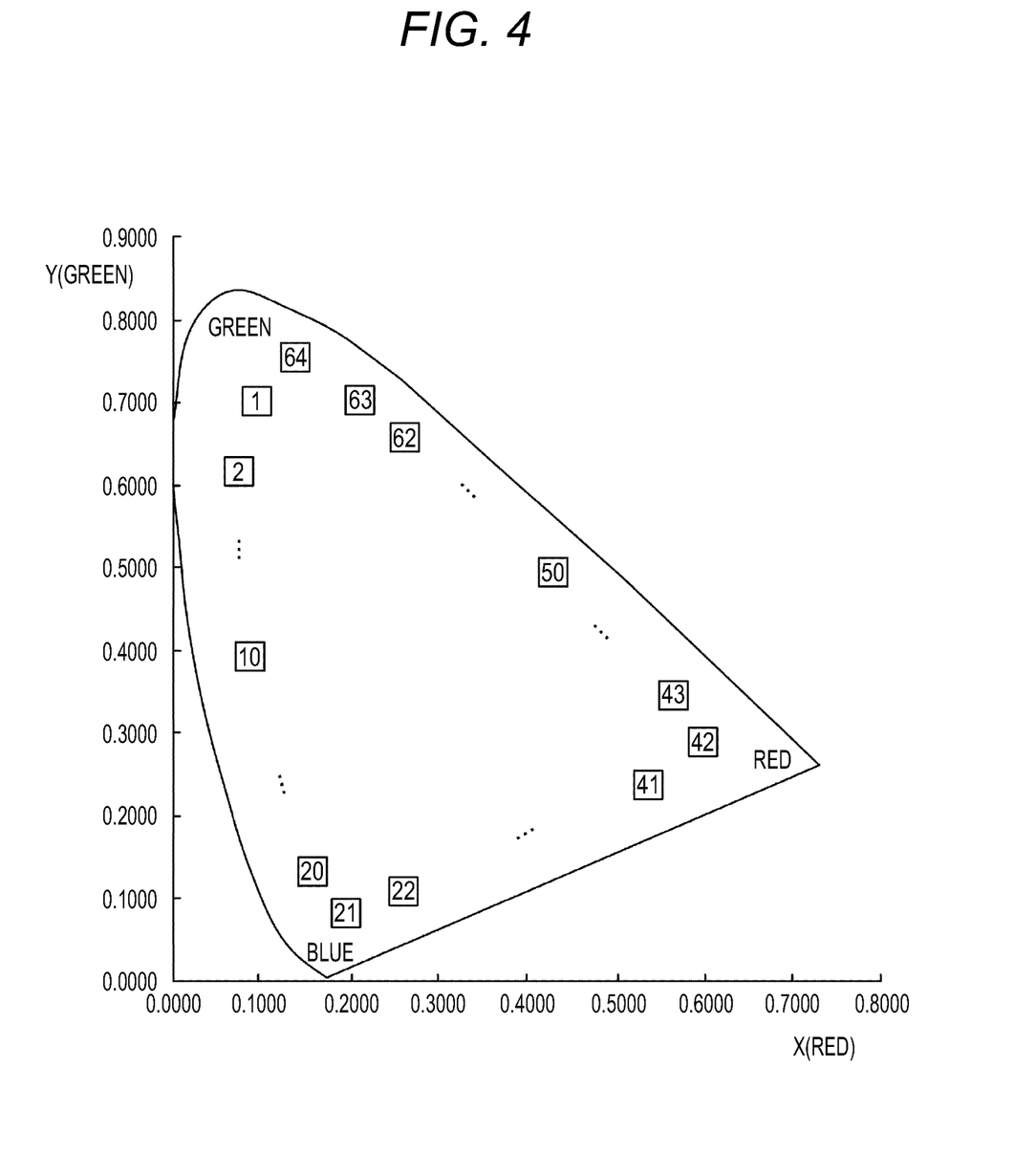
FIG. 4 shows color numbers on color coordinates.

The arrangement of the color numbers is not limited to that shown in FIG. 4, and adjacent colors may not be similar to each other as in the present embodiment, but may be completely different colors.

Further, as shown in FIG. 2, the color table shows duty ratios (reference duty ratios) DR, DG, and DB of the RLED 51, the GLED 52, and the BLED 53 corresponding to a step number (brightness) as brightness information. As a specific example, a color table corresponding to a color number 1 will be described. In the color coordinate shown in FIG. 4, a Y axis respect green and an X axis is red. The color coordinates of the color number 1 are (X, Y)=(0.7, 0.1). Therefore, if a ratio DR:DG:DB of the duty ratios DR, DG, and DB is set to 0.7:0.1:0.2 (=1−0.7−0.1), the full-color LED 5 can emit light in a color corresponding to the color number 1.

In the color table of the color number 1, each time the step number (brightness) increases, the duty ratios DR, DG, and DB are set to be larger while approximately maintaining DR:DG:DB=0.7:0.1:0.2. Accordingly, when the step number (brightness) is increased in accordance with the color table of the color number 1, the full-color LED 5 can be made bright while maintaining light emission of the color corresponding to the color number 1. In the present embodiment, the step number (brightness) is from "0" to "29", and the full-color LED 5 can be adjusted to the brightness of 30 stages.

It should be noted that the color table may be set such that a change in brightness is psychologically continuous based on Stevens' law or the like.

As shown in FIG. 3, the effect table shows a waveform height of an effect waveform corresponding to a step number (time) as unit time information. In the present embodiment, the height of the effect waveform is set within a range from a minimum value 0.00 to a maximum value 1.00.

Figure 5:
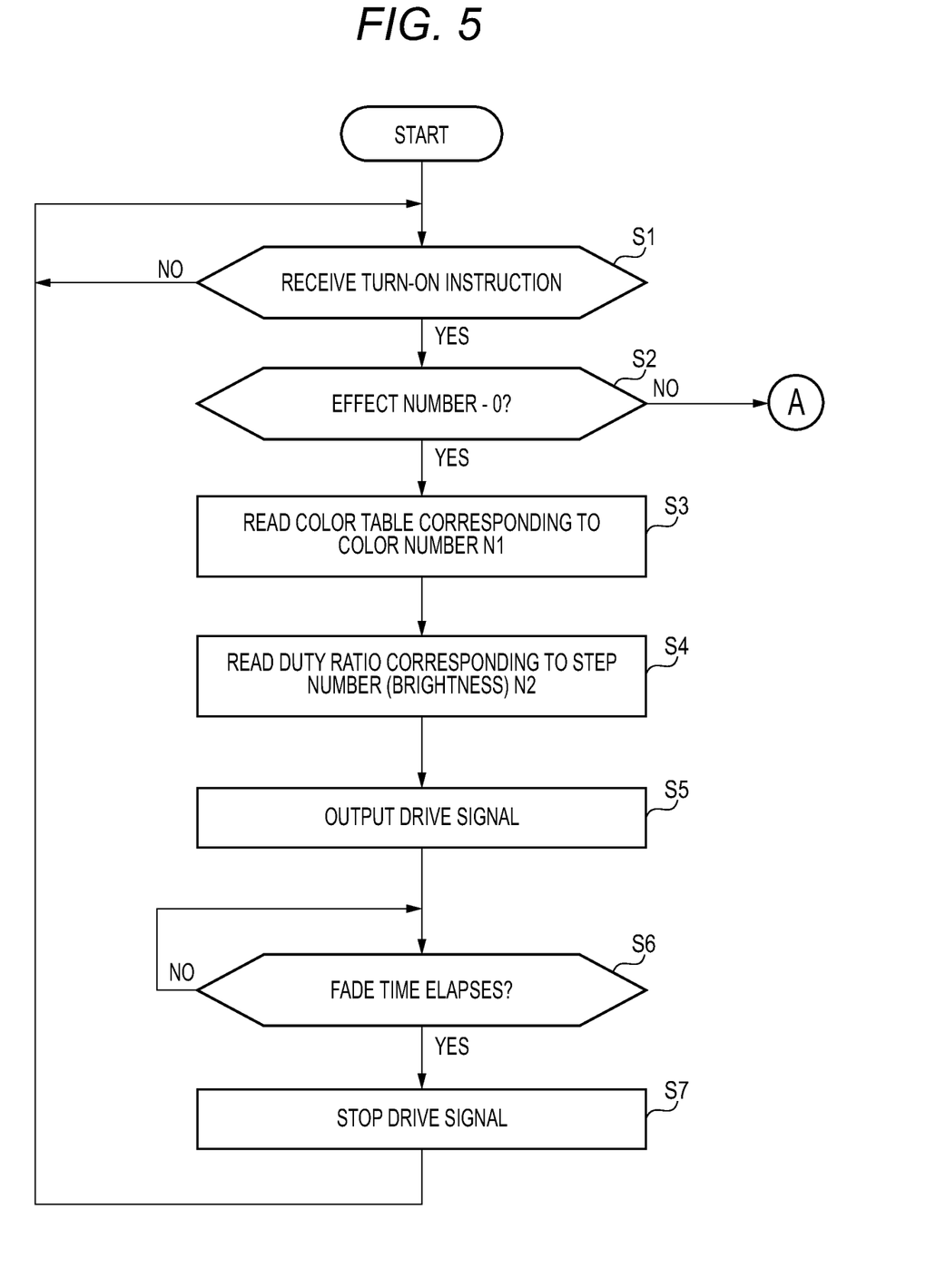
FIG. 5 is a flowchart showing a processing procedure executed by a CPU of the illumination ECU shown in FIG. 1.

Next, an operation of the illumination system 1 having the above configuration will be described with reference to a flowchart of FIG. 5. The master ECU 2 transmits a turn-on instruction to the illumination ECU 3 based on state monitoring of various switches or various sensors that detect various states on a vehicle operable by a user (a driver or the like) and information input from a host ECU (not shown).

The master ECU 2 transmits the turn-on instruction including target full-color LED information and the effect numbers. The target full-color LED information is information indicating the full-color LED 5 to be turned on. The effect numbers are information indicating effect modes of the full-color LED 5. In the present embodiment, the effect numbers are from "0" to "3". An effect number "0" is a mode in which the full-color LED 5 is turned on without changing the color and the brightness of the full-color LED 5. An effect number "1" is a mode in which the brightness of the full-color LED 5 is changed like a waveform shown in the effect table. An effect number "2" is a mode in which the color of the full-color LED 5 is changed like the waveform shown in the effect table. An effect number "3" is a mode in which both the color and the brightness of the full-color LED 5 are changed like the waveform shown in the effect table.

When transmitting the effect number "0", the master ECU 2 adds and transmits a color number N1, a step number (brightness) N2, and a fade time. Accordingly, the master ECU 2 can instruct the full-color LED 5 to be turned on with a color corresponding to the color number N1 and brightness corresponding to the step number (brightness) N2 until the fade time elapses.

Further, when transmitting the effect number "1", the master ECU 2 adds and transmits the color number N1 and the fade time. Accordingly, the master ECU 2 can instruct the full-color LED 5 to be turned on with the color corresponding to the color number N1 such that the brightness changes until the fade time elapses.

When transmitting the effect number "2", the master ECU 2 adds and transmits a reference color number N1ref as a reference color number, the step number (brightness) N2, a step number (color) N3 as division number information, and the fade time. Accordingly, the master ECU 2 can instruct the full-color LED 5 to be turned on with the brightness corresponding to the step number (brightness) N2 such that the color changes in a range of ±the step number (color) N3 centered on the reference color number N1ref until the fade time elapses.

Further, when transmitting the effect number "3", the master ECU 2 adds and transmits the reference color number N1ref, the step number (color) N3, and the fade time. Accordingly, the master ECU 2 can instruct the full-color LED 5 to be turned on such that the brightness changes and the color changes in the range of ±the step number (color) N3 centered on the reference color number N1ref until the fade time elapses.

The CPU 31A of the illumination ECU 3 (hereinafter, simply referred to as the "illumination ECU 3") functions as an acquisition unit and waits for reception of a turn-on instruction (Y in S1), and the flow proceeds to S2. In S2, the illumination ECU 3 determines whether the effect number included in the turn-on instruction is "0". When the effect number is 0 (Y in S2), the illumination ECU 3 reads a color table corresponding to the color number N1 included in the turn-on instruction from the ROM 31B (S3).

Thereafter, the illumination ECU 3 reads duty ratios DR, DG, and DB corresponding to the step number (brightness) N2 included in the turn-on instruction from the read color table (S4). Next, the illumination ECU 3 transmits target full-color LED information included in the turn-on instruction, and drive signals indicating the read duty ratios DR, DG, and DB (S5). The drive unit 33 outputs the pulse signals P1, P2, and P3 of the output duty ratios DR, DG, and DB to the full-color LED 5 indicated by the target full-color LED information. Thereafter, the illumination ECU 3 waits for elapse of the fade time included in the turn-on instruction (Y in S6) and stops the drive signals (S7), and the flow returns to S1. When output of the drive signals is stopped, the drive unit 33 stops the output of the pulse signals P1, P2, and P3 to turn off the full-color LED 5.

Figure 6:
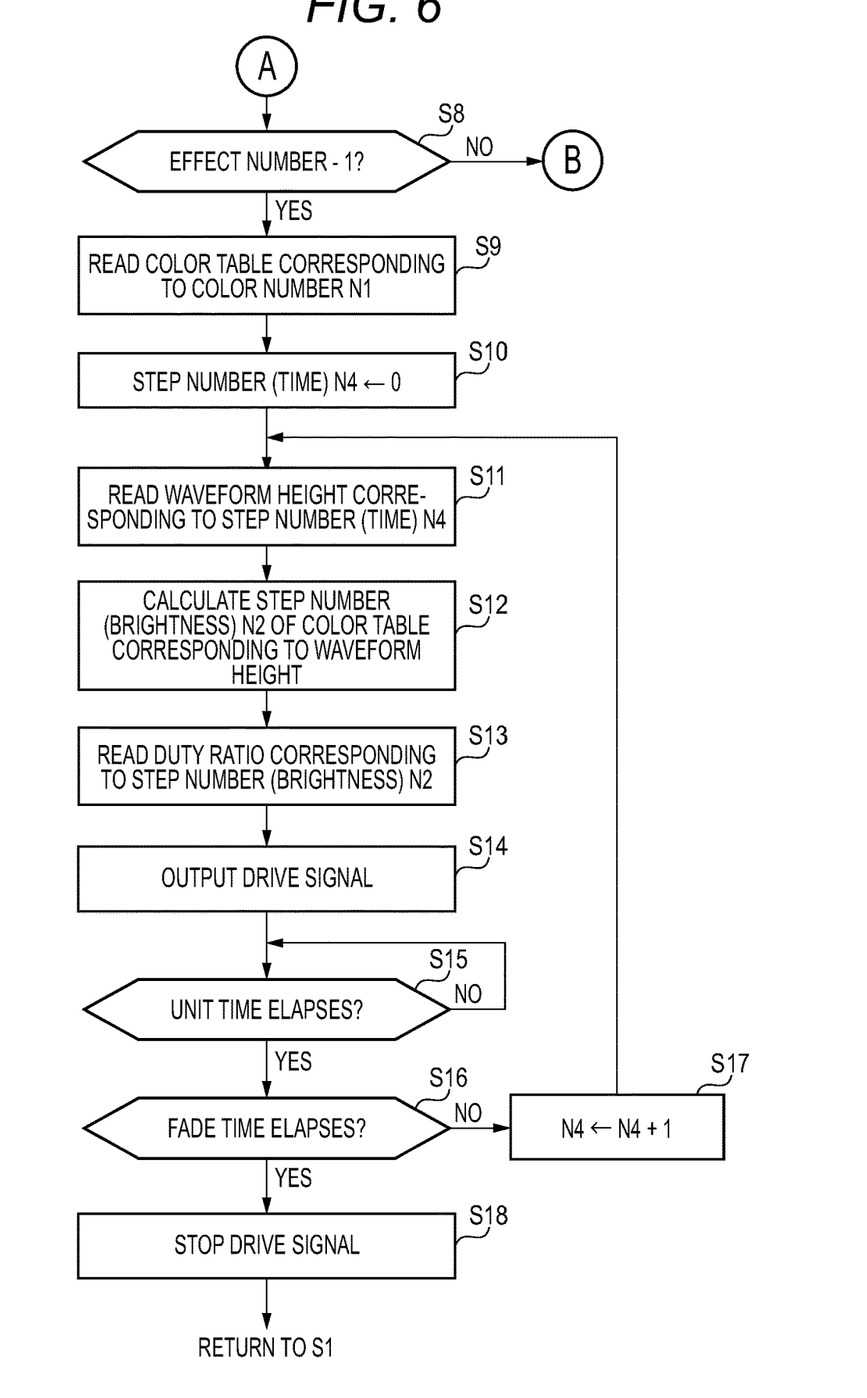
FIG. 6 is a flowchart showing a processing procedure executed by the CPU of the illumination ECU shown in FIG. 1.

On the other hand, when the effect number is not "0" (N in S2), the illumination ECU 3 then determines whether the effect number is "1" (S8 in FIG. 6). When the effect number is "1" (Y in S8), the illumination ECU 3 functions as a first effect control unit and executes S9 to S17. In S9, the illumination ECU 3 reads a color table corresponding to the color number N1 included in the turn-on instruction (S9). Thereafter, the illumination ECU 3 sets a step number (time) N4 to 0 (S10). Next, the illumination ECU 3 reads a waveform height corresponding to the step number (time) N4 from the effect table (S11).

Figure 9:
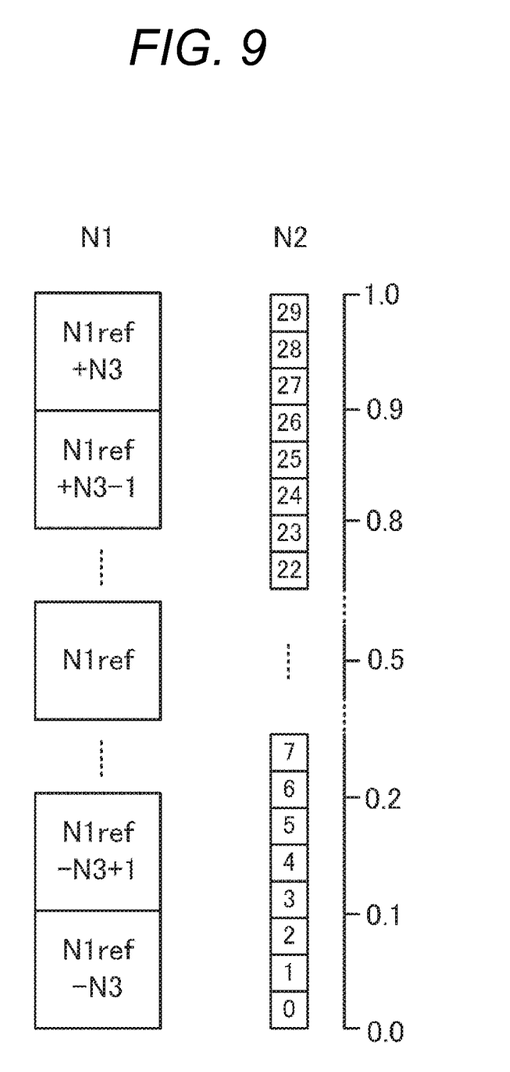
FIG. 9 shows a correspondence relation between a waveform height, a color number, and a step number (brightness).

Next, the illumination ECU 3 calculates (acquires) the step number (brightness) N2 of the color table corresponding to the waveform height read in S11 (S12). A correspondence relation between the waveform height and a step number N in the color table is, for example, as shown in FIG. 9. That is, the range from the maximum value 0.00 to the minimum value 1.0 of the waveform height is equally divided into division ranges having a total step number (brightness)=30, and numbers are allocated to each division range such that the step number (brightness) N2 increases as the waveform height increases. The step number (brightness) N2 allocated to the division range including the waveform height read in S11 is calculated as the step number (brightness) N2 corresponding to the waveform height. In this case, the illumination ECU 3 calculates, as the step number (brightness) N2 in the color table, a value obtained by subtracting 1 from an integer obtained by rounding down a decimal part of the waveform height×30 (=total step number (brightness)).

Next, the illumination ECU 3 reads duty ratios DR, DG, and DB corresponding to the step number (brightness) N2 calculated in S12 from the color table read in S9 in FIG. 6 (S13). Next, the illumination ECU 3 transmits the target full-color LED information included in the turn-on instruction, and drive signals indicating the duty ratios DR, DG, and DB read in S13 (S14). The drive unit 33 outputs the pulse signals P1, P2, and P3 of the duty ratios DR, DG, and DB to the full-color LED 5 indicated by the target full-color LED information.

Next, the illumination ECU 3 waits for a unit time (for example, 1 second) to elapse after the drive signals are output (Y in S15), and determines whether the fade time included in the turn-on instruction has elapsed after the drive signals are first output (S16). When the fade time has not elapsed (N in S16), the illumination ECU 3 increments the step number (time) N4 (S17), and then, the flow returns to step S11. Accordingly, the brightness can be changed like the waveform shown in the effect table while the color of the full-color LED 5 is kept the same.

When the fade time has elapsed (Y in S16), the illumination ECU 3 stops the drive signals (S18), and the flow returns to S1. When output of the drive signals is stopped, the drive unit 33 stops the output of the pulse signals P1, P2, and P3 to turn off the full-color LED 5.

Figure 7:
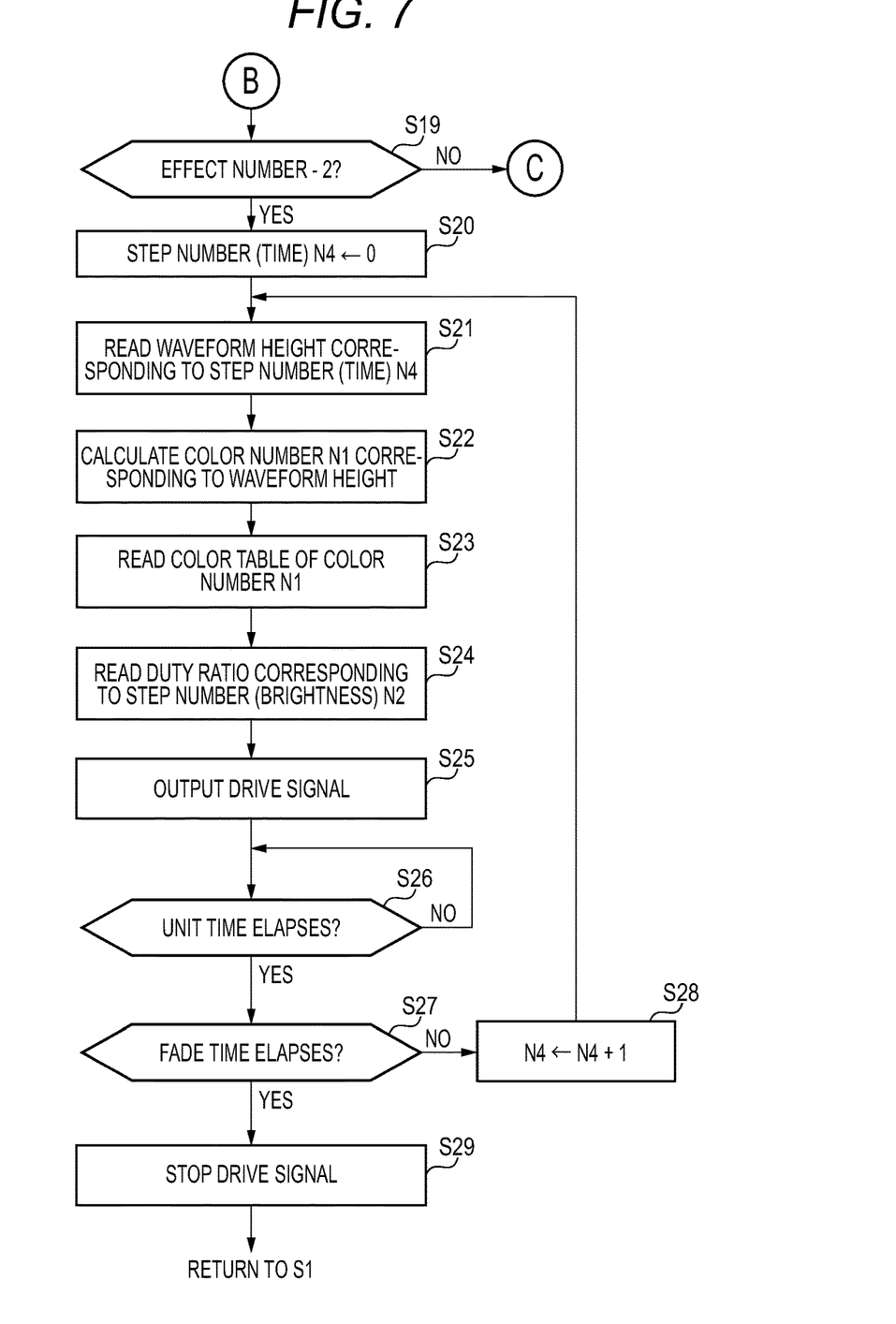
FIG. 7 is a flowchart showing a processing procedure executed by the CPU of the illumination ECU shown in FIG. 1.

On the other hand, when the effect number is not "1" (N in S8), the illumination ECU 3 then determines whether the effect number is "2" (S19 in FIG. 7). When the effect number is "2" (Y in S19), the illumination ECU 3 functions as a second effect control unit and executes S20 to S29. In S20, the illumination ECU 3 sets the step number (time) N4 to 0 (S20). Next, the illumination ECU 3 reads the waveform height corresponding to the step number (time) N4 from the effect table (S21).

Next, the illumination ECU 3 calculates the color number N1 corresponding to the waveform height read in S21 (S22). A correspondence relation between the waveform height and the color number N1 is, for example, as shown in FIG. 9. That is, the range from the minimum value 0.00 to the maximum value 1.0 of the waveform height is equally divided into division ranges of (N3×2+1), and the reference color number N1ref included in the turn-on instruction is allocated to a division range corresponding to a center 0.5 of the waveform height. N3 corresponds to the step number (color) N3 included in the turn-on instruction. Numbers are allocated such that the color number N1 increases as the waveform height increases. In this case, the illumination ECU 3 calculates, as the color number N1, a value obtained by adding a difference between an integer obtained by rounding up a decimal part of the waveform height× (N3× 2+1) and the reference color number N1ref to the integer.

Next, the illumination ECU 3 reads a color table corresponding to the color number N1 calculated in S22 from the ROM 31B (S23). Thereafter, the illumination ECU 3 reads duty ratios DR, DG, and DB corresponding to the step number (brightness) N2 included in the turn-on instruction from the color table read in S23 (S24). Next, the illumination ECU 3 transmits the target full-color LED information included in the turn-on instruction, and drive signals indicating the duty ratios DR, DG, and DB read in S24 (S25). The drive unit 33 outputs the pulse signals P1, P2, and P3 of the duty ratios DR, DG, and DB to the full-color LED 5 indicated by the target full-color LED information.

Next, the illumination ECU 3 determines whether a unit time (for example, 15) has elapsed after the drive signals are output (S26). When the unit time has elapsed (Y in S26), the illumination ECU 3 determines whether the fade time included in the turn-on instruction has elapsed after the drive signals are first output (S27). When the fade time has not elapsed (N in S27), the illumination ECU 3 increments the step number (time) N4 (S28), and then, the flow returns to step S21. Accordingly, the color can be changed like the waveform shown in the effect table while the brightness of the full-color LED 5 is kept the same.

When the fade time has elapsed (Y in S27), the illumination ECU 3 stops the drive signals (S29), and the flow returns to S1. When output of the drive signals is stopped, the drive unit 33 stops the output of the pulse signals P1, P2, and P3 to turn off the full-color LED 5.

Figure 8:
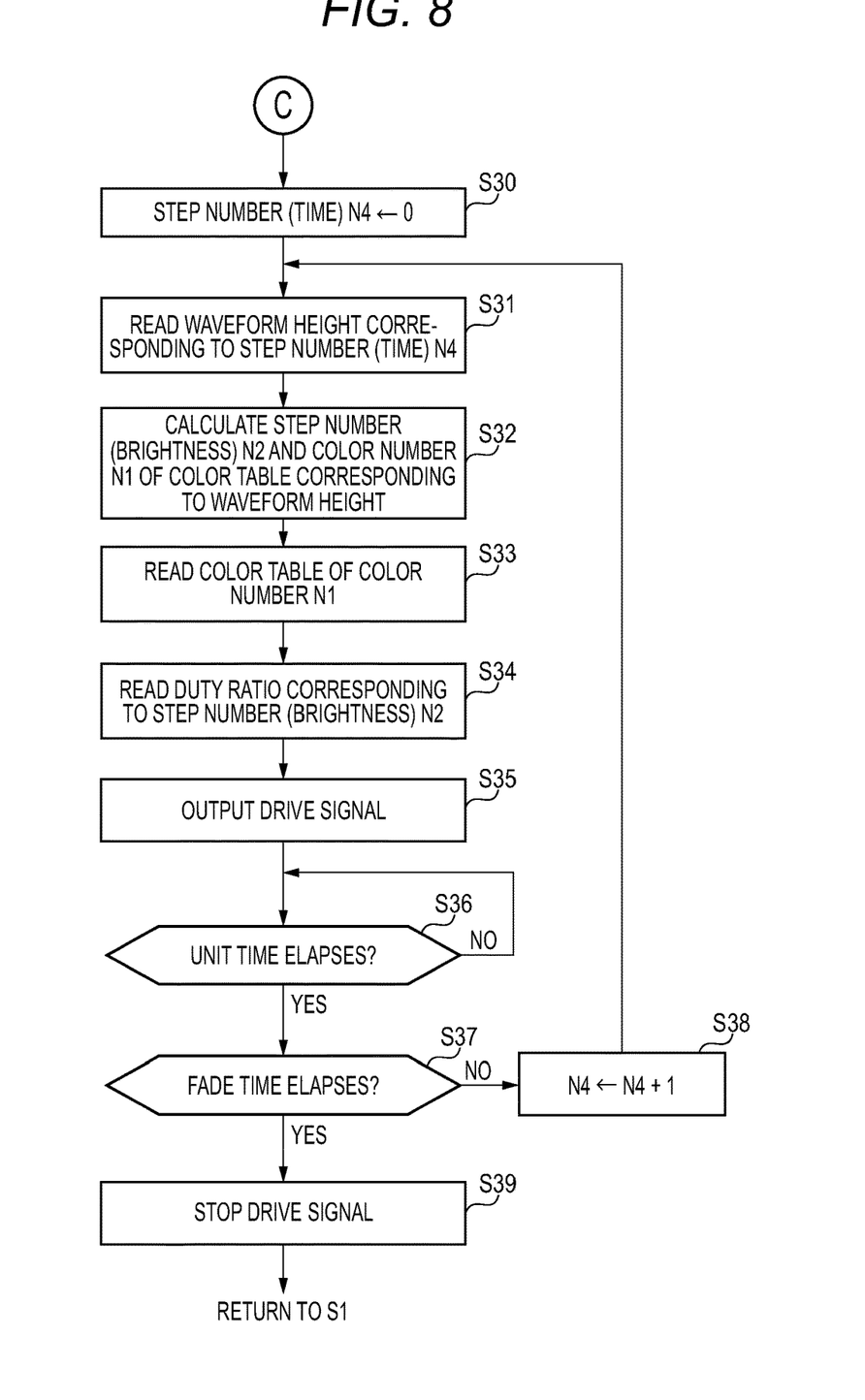
FIG. 8 is a flowchart showing a processing procedure executed by the CPU of the illumination ECU shown in FIG. 1.

On the other hand, when the effect number is not "2" (N in S19), the illumination ECU 3 determines that the effect number is "3" and functions as a third effect control unit, and the flow proceeds to S30 to S39 in FIG. 8. In S30, the illumination ECU 3 sets the step number (time) N4 to 0.

Next, the illumination ECU 3 reads the waveform height corresponding to the step number (time) N4 from the effect table (S31).

Next, the illumination ECU 3 calculates the step number (brightness) N2 and the color number N1 of the color table corresponding to the waveform height read in S31 (S32). In S32, the illumination ECU 3 calculates the step number (brightness) N2 of the color table corresponding to the waveform height in the same manner as in S12 described above. Further, the illumination ECU 3 calculates the color number N1 corresponding to the waveform height in the same manner as in S22 described above.

Thereafter, the illumination ECU 3 reads a color table of the color number N1 calculated in S32 (S33). Next, the illumination ECU 3 reads and acquires duty ratios DR, DG, and DB corresponding to the step number (brightness) N2 calculated in S32 from the color table read in S33 (S34). Next, the illumination ECU 3 transmits target full-color LED information included in the turn-on instruction, and drive signals indicating the read duty ratios DR, DG, and DB (S35). The drive unit 33 outputs the pulse signals P1, P2, and P3 of the duty ratios DR, DG, and DB to the full-color LED 5 indicated by the target full-color LED information.

Next, the illumination ECU 3 determines whether a unit time (for example, 15) has elapsed after the drive signals are output (S36). When the unit time has elapsed (Y in S36), the illumination ECU 3 determines whether the fade time included in the turn-on instruction has elapsed after the drive signals are first output (S37). When the fade time has not elapsed (N in S37), the illumination ECU 3 increments the step number (time) N4 (S38), and then, the flow returns to step S21. Accordingly, the color and the brightness of the full-color LED 5 can be changed like the waveform shown in the effect table.

When the fade time has elapsed (Y in S37), the illumination ECU 3 stops the drive signals (S39), and the flow returns to S1. When output of the drive signals is stopped, the drive unit 33 stops the output of the pulse signals P1, P2, and P3 to turn off the full-color LED 5.

According to the above embodiment, when the effect number is "1", the illumination ECU 3 can change the brightness of the full-color LED 5 like the effect waveform shown in the effect table, and when the effect number is "2", the illumination ECU 3 can change the color of the full-color LED 5 like the effect waveform shown in the effect table. Accordingly, effects of changing not only the color but also the brightness can be performed using the effect table, and effects having various variations can be executed.

According to the above embodiment, when the effect number is "3", the illumination ECU 3 can change both the color and the brightness of the full-color LED 5 like the effect waveform shown in the effect table. Accordingly, effects of changing both the color and the brightness, not just the color or the brightness, can be performed using the effect table, and effects having various variations can be executed.

According to the above embodiment, the illumination ECU 3 divides the range from the maximum value 1.0 to the minimum value 0.0 of the waveform height into the number (N3×2+1) of division ranges corresponding to the step number (color) N3, allocates the color number N1 to the division ranges based on the reference color number N1ref, and acquires the color number N1 allocated to the division ranges including the waveform height as the color number N1 corresponding to the waveform height. Accordingly, when the color is changed, it is possible to change the color to a color at a stage corresponding to the step number (color)

N3 based on the reference color number N1ref, and it is possible to further execute effects having various variations.

According to the above embodiment, when an effect number is received from the master ECU 2, the full-color LED 5 can emit light in an effect mode corresponding to the received effect number. Accordingly, it is unnecessary for the master ECU 2 to transmit a command to the illumination ECU 3 each time the color or the brightness is changed, and an occupation time of a communication bus can be reduced.

The present disclosure is not limited to the embodiment described above, and modifications, improvements, or the like can be made as appropriate. In addition, materials, shapes, dimensions, numbers, arrangement positions, and the like of the respective constituent elements in the above embodiment are optionally selected and are not limited as long as the present disclosure can be implemented.

In the above embodiment, only one effect table is provided, but the present disclosure is not limited thereto. A plurality of effect tables may be provided. Accordingly, it is possible to change the color and the brightness with a fluctuation waveform, or to change the color and the brightness with a heartbeat waveform, and it is possible to further execute the effects having various variations.

In the above embodiment, the duty ratios DR, DG, and DB read from the color table are output as they are as the output duty ratios DR, DG, and DB, but the present disclosure is not limited thereto. Based on the duty ratios read from the color table, complementary duty ratios complemented for each divided time obtained by further dividing the unit time may be obtained, and the obtained complementary duty ratios may be output as output duty ratios.

Here, features of the illumination control device and the illumination system according to the embodiment of the present disclosure described above will be briefly summarized and listed in [1] to [5] below.

[1] An illumination control device (3) for controlling output duty ratios (DR, DG, DB) of pulse signals (P1 to P3) output to a red light emitting element (51), a green light emitting element (52), and a blue light emitting element (53), the illumination control device including:
  an acquisition unit (31A) configured to acquire effect information;
  a first storage unit (31B) configured to store a plurality of color tables showing reference duty ratios (DR, DG, DB) corresponding to brightness information and provided for each piece of color information;
  a second storage unit (31B) configured to store an effect table showing a waveform height of an effect waveform corresponding to unit time information;
  a first effect control unit (31A) configured to sequentially acquire the brightness information corresponding to the waveform height for each piece of unit time information when the effect information for changing brightness is acquired, sequentially acquire the reference duty ratios (DR, DG, DB) corresponding to the sequentially acquired brightness information from the color tables corresponding to the color information added to the effect information, and output the pulse signals (P1 to P3) of the output duty ratios (DR, DG, DB) corresponding to the sequentially acquired reference duty ratios (DR, DG, DB); and
  a second effect control unit (31A) configured to sequentially acquire the color information corresponding to the waveform height for each piece of unit time information when the effect information for changing color is acquired, sequentially acquire the reference duty ratios (DR, DG, DB) corresponding to the brightness information added to the effect information from the color tables corresponding to the sequentially acquired color information, and output the pulse signals (P1 to P3) of the output duty ratios (DR, DG, DB) corresponding to the sequentially acquired reference duty ratios (DR, DG, DB).

According to the configuration of [1], the first effect control unit (31A) and the second effect control unit (31A) can perform control to change the brightness and the color like the effect waveform of the effect table. Accordingly, effects of changing not only the color but also the brightness can be performed using the effect table, and effects having various variations can be executed.

[2] The illumination control device (3) according to [1], further including:
  a third effect control unit (31A) configured to sequentially acquire the color information and the brightness information corresponding to the waveform height for each piece of unit time information when the effect information for changing both the color and the brightness is acquired, sequentially acquire the reference duty ratios (DR, DG, DB) corresponding to the sequentially acquired brightness information from the color tables corresponding to the sequentially acquired color information, and output the pulse signals (P1 to P3) of the output duty ratios (DR, DG, DB) corresponding to the sequentially acquired reference duty ratios (DR, DG, DB).

According to the configuration of [2], the third effect control unit (31A) can perform control to change both the color and the brightness using the effect table. Accordingly, effects of changing both the color and the brightness, not just the color or the brightness, can be performed using the effect table, and the effects having various variations can be executed.

[3] The illumination control device (3) according to [1], in which
  the color information includes color numbers,
  the effect information for changing the color includes a reference color number and division number information of the waveform height, and
  the second effect control unit (31A) divides a range from a maximum value to a minimum value of the waveform height into a number of division ranges according to the division number information, allocates the color numbers based on the reference color number to the division ranges, and acquires the color numbers allocated to the division ranges including the waveform height as the color information corresponding to the waveform height.

According to the configuration of [3], when the color is changed, it is possible to change the color to a color at a stage according to the division number information with reference to the reference color number. Accordingly, it is possible to further execute the effects having various variations.

[4] The illumination control device (3) according to any one of [1] to [3], in which
  the acquisition unit (31A) receives and acquires the effect information transmitted from a host control device (2).

According to the configuration of [4], when the effect information is received from the host control device (2), the red light emitting element (51), the green light emitting element (52), and the blue light emitting element (53) can emit light in an effect mode according to the received effect information. Accordingly, it is unnecessary for the host control device (2) to transmit a command to the illumination control device (3) each time the color or the brightness is changed, and an occupation time of a communication bus can be reduced.

[5] An illumination system (1) including:
a host control device (2) configured to transmit effect information; and
an illumination control device (3) configured to control output duty ratios (DR, DG, DB) of pulse signals (P1 to P3) output to a red light emitting element (51), a green light emitting element (52), and a blue light emitting element (53) in accordance with communication with the host control device (2), in which
the illumination control device (3) includes:
an acquisition unit (31A) configured to acquire effect information;
a first storage unit (31B) configured to store a plurality of color tables showing reference duty ratios (DR, DG, DB) corresponding to brightness information and provided for each piece of color information;
a second storage unit (31B) configured to store an effect table showing a waveform height of an effect waveform corresponding to unit time information;
a first effect control unit (31A) configured to sequentially acquire the brightness information corresponding to the waveform height for each piece of unit time information when the effect information for changing brightness is acquired, sequentially acquire the reference duty ratios (DR, DG, DB) corresponding to the sequentially acquired brightness information from the color tables corresponding to the color information added to the effect information, and output the pulse signals (P1 to P3) of the output duty ratios (DR, DG, DB) corresponding to the sequentially acquired reference duty ratios (DR, DG, DB); and
a second effect control unit (31A) configured to sequentially acquire the color information corresponding to the waveform height for each piece of unit time information when the effect information for changing color is acquired, sequentially acquire the reference duty ratios (DR, DG, DB) corresponding to the brightness information added to the effect information from the color tables corresponding to the sequentially acquired color information, and output the pulse signals (P1 to P3) of the output duty ratios (DR, DG, DB) corresponding to the sequentially acquired reference duty ratios (DR, DG, DB).

According to the configuration of [5], the first effect control unit (31A) and the second effect control unit (31A) can perform control to change the brightness and the color like the effect waveform of the effect table. Accordingly, effects of changing not only the color but also the brightness can be performed using the effect table, and effects having various variations can be executed.

What is claimed is:

1. An illumination control device for controlling output duty ratios of pulse signals output to a red light emitting element, a green light emitting element, and a blue light emitting element, the illumination control device comprising:
an acquisition unit configured to acquire effect information;
a first storage unit configured to store a plurality of color tables showing reference duty ratios corresponding to brightness information and provided for each piece of color information;
a second storage unit configured to store an effect table showing a waveform height of an effect waveform corresponding to unit time information;
a first effect control unit configured to sequentially acquire brightness information corresponding to the waveform height for each piece of unit time information when effect information for changing brightness like the waveform shown in the effect table is acquired together with color information, sequentially acquire the reference duty ratios corresponding to the sequentially acquired brightness information from the color tables corresponding to the acquired color, and output the pulse signals of the output duty ratios corresponding to the sequentially acquired reference duty ratios; and
a second effect control unit configured to sequentially acquire the color information corresponding to the waveform height for each piece of unit time information when the effect information for changing color like the waveform shown in the effect table is acquired together with brightness information, sequentially acquire the reference duty ratios corresponding to the acquired brightness information from the color tables provided for the sequentially acquired color information, and output the pulse signals with the output duty ratios corresponding to the sequentially acquired reference duty ratios.

2. The illumination control device according to claim 1, further comprising:
a third effect control unit configured to sequentially acquire color information and brightness information corresponding to the waveform height for each piece of unit time information when effect information for changing both the color and the brightness like the waveform shown in the effect table is acquired, sequentially acquire the reference duty ratios corresponding to the sequentially acquired brightness information from the color tables provided for the sequentially acquired color information, and output the pulse signals with the output duty ratios corresponding to the sequentially acquired reference duty ratios.

3. The illumination control device according to claim 1, wherein
the color information includes color numbers,
the effect information for changing the color includes a reference color number and division number information of the waveform height, and
the second effect control unit divides a range from a maximum value to a minimum value of the waveform height into a number of division ranges according to the division number information, allocates the color numbers based on the reference color number to the division ranges, and acquires the color numbers allocated to the division ranges including the waveform height as the color information corresponding to the waveform height.

4. The illumination control device according to claim 3, wherein the division number information is included in a turn-on instruction.

5. The illumination control device according to claim 1, wherein
the acquisition unit receives and acquires the effect information transmitted from a host control device.

6. The illumination control device according to claim 1, wherein the brightness information corresponding to the waveform height for each piece of unit time information comprises first steps from 0 to 29, wherein the waveform height for each piece of unit time information comprises a range from a minimum value of 0.00 to a maximum value of 1.00, and wherein the unit time information comprises second steps from 0 to 1024.

7. An illumination system comprising:

a host control device configured to transmit effect information; and an illumination control device configured to control output duty ratios of pulse signals output to a red light emitting element, a green light emitting element, and a blue light emitting element in accordance with communication with the host control device, wherein the illumination control device includes:
- an acquisition unit configured to acquire effect information;
- a first storage unit configured to store a plurality of color tables showing reference duty ratios corresponding to brightness information and provided for each piece of color information;
- a second storage unit configured to store an effect table showing a waveform height of an effect waveform corresponding to unit time information;
- a first effect control unit configured to sequentially acquire the brightness information corresponding to the waveform height for each piece of unit time information when the effect information for changing brightness like the waveform shown in the effect table is acquired together with color information, sequentially acquire the reference duty ratios corresponding to the sequentially acquired brightness information from the color tables corresponding to the acquired color information, and output the pulse signals with the output duty ratios corresponding to the sequentially acquired reference duty ratios; and
- a second effect control unit configured to sequentially acquire color information corresponding to the waveform height for each piece of unit time information when the effect information for changing color like the waveform shown in the effect table is acquired together with brightness information, sequentially acquire the reference duty ratios corresponding to the brightness information from the color tables provided for the sequentially acquired color information, and output the pulse signals with the output duty ratios corresponding to the sequentially acquired reference duty ratios.

* * * * *